UNITED STATES PATENT OFFICE.

BENJAMIN LAMBERT, COUNTY OF SURREY, ENGLAND.

IMPROVEMENT IN TREATMENT OF PRINTED PAPER TO REMOVE INK AND RECOVER THE PULP.

Specification forming part of Letters Patent No. 32,879, dated July 23, 1861.

*To all whom it may concern:*

Be it known that I, BENJAMIN LAMBERT, of 4 Warner Street, Dover Road, in the county of Surrey, England, have made an invention of an Improvement in Treating Printed Paper to Remove the Ink and to Obtain Pulp; and I do hereby declare the same to be particularly described and ascertained in and by the following statement thereof—that is to say:

The object of my invention is to remove the ink from printed paper and convert such paper into pulp fit for being reconverted into paper.

In carrying out my invention the printed paper in its ordinary state should be boiled in a closed vessel for about two hours in a weak caustic alkali of a specific gravity of 1001, water being 1000, after which the paper and liquor should be allowed to stand not only until they may be cooled down to ordinary atmospheric temperature, but for several or about twelve hours afterward. The soaking of the paper in the cold alkaline liquor after being boiled therein as above described I find to be productive of a very beneficial result. Afterward the lye or alkaline liquor may be removed from the paper and a fresh supply of such alkaline liquor be substituted and the whole be boiled for about one hour. After this the boiled paper is to be well beaten in the lye, or so broken up or reduced therein as to be converted into pulp. Subsequently the lye should be drawn from the pulp, and the latter be thoroughly washed with water. I find that by the soaking of the paper in the cold lye after the two have been boiled together the ink will be more thoroughly detached or neutralized by the next application and boiling of the lye. I also find that the cold-lye soaking of the paper materially improves the pulping part of the process; and, furthermore, by beating the paper to pulp while such paper is in the hot lye it will not only be pulped to better advantage than either before or afterward, but the beating process will greatly aid in detaching and neutralizing the ink. I have reason to believe that the first boiling of the paper in the lye serves to expand the fibers of the paper and soften the resinous and saponaceous matters of the ink, and that the subsequent cold soaking for several hours operates to contract the fibers and aid in loosening their connection with one another and with the pigments, resins, and oily matters of the ink. The subsequent boiling and beating of the paper in fresh alkaline lye not only re-expands the fibers and the extraneous matters so as to favor their separation, but causes the paper to be reduced to pulp to great advantage.

I am aware that for the removal of greasy matters from fabrics they have been boiled and soaked in an alkaline lye and subsequently washed with water. Therefore I do not claim such, broadly; but What I do claim is—

My improved process, substantially as described, for treating printed paper in order to remove its ink and convert such paper into pulp fit to be remade into paper.

B. LAMBERT.

Witnesses:
 GEO. PITT,
26 *Southampton Building.*
 THOS. BROWN,
2 *George Yard, Lombard Street, London.*